United States Patent Office 3,417,140
Patented Dec. 17, 1968

3,417,140
AMIDO-AMINE COMPOSITIONS
Wayne F. McWhorter, Harry O. Kirwan, and Charles E. Banfield, Louisville, Ky., assignors to Celanese Coating Company, a corporation of Delaware
No Drawing. Filed Oct. 20, 1965, Ser. No. 499,072
5 Claims. (Cl. 260—561)

ABSTRACT OF THE DISCLOSURE

Amido-amine compositions are prepared by reacting a mixture of a fatty amine and a polyalkylene polyamine with an alpha-beta unsaturated carbonylic compound through the Michael addition of an amine group across the unsaturated group of the carbonylic compound and through the condensation of an amine group with the carbonylic group. Such compounds are useful as epoxy resin curing agents.

---

This invention pertains to amido-amine compositions which are the reaction products of a fatty amine, a polyalkylene amine and an alpha-beta unsaturated carbonylic compound. More particularly, this invention relates to amido-amine compositions which contain an average of more than 2 active amine hydrogens per molecule. In another aspect, this invention pertains to curable polyepoxide compositions which contain the amido-amine composition as the curing agent and to the cured products obtained therefrom.

Active hydrogen containing amines react with alpha-beta unsaturated carbonylic compounds by addition across the double bond, the reaction being known as the Michael addition. This reaction can be shown by the reaction of ethylene diamine with methyl acrylate:

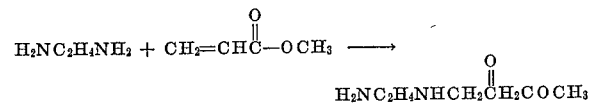

As can be seen from this formula, the —NH$_2$ group adds to the acrylate double bond leaving an >NH group which still retains an active hydrogen atom.

Furthermore, active hydrogen containing amines will react with carbonylic compounds, such as carboxylic acids, carboxylic acid esters and carboxylic acid amides to form substituted amides with the liberation of water, alcohol or ammonia respectively. Such reactions are shown by the following general reactions:

(1) 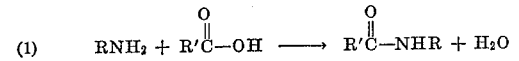

(2) 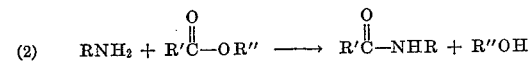

(3) 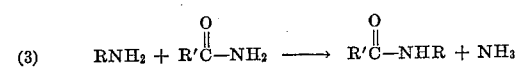

Alpha-beta unsaturated carbonylic compounds, such as the acrylic acids, acrylic esters and acrylamides, can be considered to be difunctional when reacted with amines since they can react with the amine groups at two sites, the double bond and the carbonylic group.

When polyamines are reacted with an acrylic acid, ester or amide, monomeric or polymeric products are obtained depending upon the ratio of the starting materials and the conditions under which the reaction takes place.

Polyalkylene polyamines, for example diethylene triamine and tetraethylene pentamine, will react with alpha-beta unsaturated carbonylic compounds, such as acrylic and substituted acrylic acids, esters and amides to yield viscous dark colored products having a high amine hydrogen content. Such products have limited use as epoxide resin curing agents, especially in non-solvent systems because of the dark color, their viscous nature and their high reactivity with the epoxide resin. In addition, films prepared from these amido-amines and polyepoxide compounds exhibit poor flow and do not properly wet the substrate. After being cured, the films are somewhat uneven, bumpy and hazy. The amine compounds have a tendency to "sweat out" on the surface of the film giving the film a greasy, hazy appearance.

It has now been found that superior amido-amines can be made by reacting a fatty amine along with the polyalkylene polyamine and the alpha-beta unsaturated carbonylic compound. The fatty amine is a mono or di amine having as one of the substituents on a nitrogen atom a hydrocarbon radical containing 8 to 24 carbon atoms. This radical can be derived from naturally occurring fats and oils or can be of a synthetic derivation. The amido-amines of this invention are light colored and are liquid or semi-liquid. They can be blended with polyepoxide resins over a wide range of proportions. When used with polyepoxide resins in non-solvent systems, the reactivity is within a workable and controllable range. Films prepared from the amido-amines of this invention and polyepoxide resins exhibit excellent flow characteristics with a minimum of crawling. The curing agents show little or no tendency to "sweat out" on the surface of the film. The cured films are smooth and level, have excellent clarity and are strong and flexible.

Amido-amines made from a fatty amine and an alpha-beta unsaturated carbonylic compound with no polyalkylene polyamine reactant are light colored and liquid. However, when these products are blended with polyepoxide resins, the amido-amine and the polyepoxide resin separate into two phases and little or no cure takes place.

The amido-amine compositions of this invention are the reaction products of a polyalkylene polyamine, a fatty amine and an ethylenically unsaturated carbonylic compound. The polyalkylene polyamine can be represented by the general formula $$H_2NR(NHR)_nNH_2$$

wherein R is a hydrocarbon radical containing 2 to 4 carbon atoms and $n$ has the value of 0 to 4.

The fatty amine can be represented by the general formula

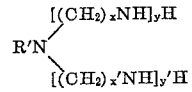

wherein R' is a hydrocarbon radical containing 8 to 24 carbon atoms, $x$ and $x'$ each have values of 2 to 4 and $y$ and $y'$ each have values of 0 to 2.

The alpha-beta unsaturated carbonylic compound can be represented by the general formula

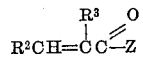

wherein $R^2$ is hydrogen or methyl, $R^3$ is hydrogen, methyl or ethyl and Z is the radical —NH$_2$, —OH, —OCH$_3$, or —OC$_2$H$_5$.

These components are reacted in the ratio of the sum of the mols of polyalkylene polyamine and fatty amine to mols of alpha-beta unsaturated carbonylic compound of 4:3 to 2:1 wherein the molar ratio of polyalkylene polyamine to fatty amine is 20:1 to 1:3 and wherein the reaction product contains an average of more than 2 amino hydrogen atoms per molecule.

Illustrative of the polyalkylene polyamines that are useful in this invention are ethylene diamine, diethylene triamine, tetraethylene pentamine, triethylene tetramine, pentaethylene hexamine, imino-bis-propylamine, propylene diamine, butylene diamine, tripropylene tetramine, dibutylene triamine, etc. The preferred polyalkylene polyamines are those which contain 2 primary amine groups and at least 1 secondary amine group.

Fatty amines that are useful in this invention include 2-ethylhexyl amine, caprylylamine, caprylamine, laurylamine, myristylamine, palmitylamine, stearylamine, oleylamine, linoleylamine, and linolenylamine. Unsymmetrical alkyl fatty amines are also included and include N-methyloctylamine, N-methyl dodecylamine, N-methylhexadecylamine, N-methyldidodecylamine and N-methyldihexadecyl amine. Fatty amines include mixture of such amines which are derived from corresponding mixed fatty acids and are named after the naturally occurring oils and waxes from which they are derived. Such amines are coconut amine, tallow amine, hydrogenated tallow amine, soya amine, etc. Additional fatty amines are those prepared by reacting a fatty amine as described above with an unsaturated nitrile, such as acrylonitrile, and reducing the nitrile group. Such amines include N-oleyl-trimethylene diamine, N-lauryl-trimethylene diamine, N-caprylyl-trimethylene diamine, N-(3 - aminopropyl) - 2-aminoundecane, N-(3-aminopropyl)-2 aminononane, N-(3-aminopropyl)-2-aminopentadecane, etc. Other amines are N-stearyl-ethylene diamine, N-palmityl-tetramethylene diamine and N-oleyl-ethylene diamine. Still other amines include N-tallow-bis aminopropylamine, N-soya - bis aminopropylamine and the like. The preferred fatty amines are those which contain one primary amine group and one secondary amine group.

The alpha-beta unsaturated carbonylic compounds useful in this invention include acrylic acid, methacrylic acid, crotonic acid, methyl acrylate, ethyl acrylate, methyl methacrylate, methyl ethacrylate, ethyl methacrylate, methyl crotonate, ethyl crotonate, acrylamide, methacrylamide, and crotonamide. Such compounds have ethylenic unsaturation alpha to the carbonyl carbon and contain functional carboxylic acid or carboxylic acid derivative groupings.

Additional unsaturated carbonylic compounds that can be used in this invention are unsaturated dibasic acids, esters and amides wherein the unsaturation is adjacent to at least one carbonyl group. Examples of such compounds are maleic acid, fumaric acid, itaconic acid, citraconic acid, mesaconic acid, the methyl and ethyl esters of these acids and the amides of the acids.

The amido-amines of this invention contain an average of more than 2 active amine hydrogens per molecule. This plurality of active amine hydrogens is necessary in order that the compositions will function as epoxide resin curing agents. Active amine hydrogens are obtained in the compositions by reacting a molar excess of the amine with the alpha-beta unsaturated carbonylic compound. Low ratios of amine to carbonylic compounds, i.e., ratios approaching 1:1, produce highly polymeric and complex compositions. These high polymers have limited usage as epoxide resin curing agents. In order to obtain compositions that have good compatibility with epoxide resins and that have desirable handling characteristics, it is preferred that the ratio of the sum of the number of mols of fatty amine and the number of mols of polyalkylene polyamine to the number of mols of alpha-beta unsaturated carbonylic compound be about 4:3 to about 2:1. When ratios of higher than 2:1 are used, the compositions will contain a considerable amount of unreacted amine. However, such compositions have been found to be good epoxide resin curing agents for certain applications.

When unsaturated dicarbonylic compounds rather than monocarbonylic compounds are reacted with the polyalkylene polyamines and fatty amines, somewhat different ratios of reactants are utilized. Unsaturated dicarbonylic compounds, such as fumaric acid or dimethyl maleate, are trifunctional with respect to their reactivity with amines in that they contain one reactive double bond and 2 reactive carbonylic groups. When reacting a polyalkylene polyamine and a fatty amine with an unsaturated dicarbonylic compound, the preferred ratio of the sum of the mols of polyalkylene polyamine plus the mols of fatty amine to mols of unsaturated dicarbonylic compound is about 3 to 1. Somewhat lower ratios, down to about 2 mols of amine to 1 mol of unsaturated dicarbonylic compound, can be used provided the reaction is carefully conducted and is stopped before gelation can occur.

As has been stated hereinbefore, the use of a fatty amine in combination with a polyalkylene polyamine in the preparation of the compositions of this invention produces outstanding epoxide resin curing agents. The use of molar ratios of fatty amine to polyalkylene polyamine as low as 1:20 will produce epoxy resin curing agents having a marked improvement over those wherein no fatty amine is used. Molar ratios of fatty amine to polyalkylene polyamine as high as 3:1 can be used to obtain these improved curing agents. However, in order to obtain amido-amines having outstanding properties as epoxide resin curing agents, it is preferred to use a molar ratio of fatty amine to polyalkylene polyamine of about 1:5 to about 2:1.

The reaction involved in preparing the compositions of this invention is a dual reaction involving a Michael addition in which the amine adds across the double bond of the carbonylic compound, and amidification wherein the amine condenses with carboxylic acid functional groups. These two reactions can be carried out concomitantly by carrying out the reaction at a temperature above 250° F. However, generally and preferably the reaction is conducted by slowly adding the carbonylic compound to the amine at room temperature and allowing the temperature to rise to about 150° F., this temperature rise being due to the exothermic Michael reaction. After the termination of the exothermic reaction, heat is applied and the amidification reaction is conducted at a temperature of about 225° F. to about 400° F. Vacuum may be used in the latter stages of the reaction to aid in removal of by-products formed in the condensation reaction.

The amido-amines of this invention are eminently suitable for use as epoxide resin curing agents. Useful epoxide resins are those compounds which contain more than one vicinal epoxide group per molecule. The epoxide resins can be saturated or unsaturated, aliphatic, cycloaliphatic, aromatic, or heterocyclic. They can be monomeric or polymeric in nature.

Preferred epoxide resins for use in the compositions of this invention are polyglycidyl ethers of polyhydric phenols obtained by reacting a polyhydric phenol in an excess of epichlorohydrin with sodium hydroxide. Such polyhydric phenols include p,p'-dihydroxydiphenyl propane (Bisphenol A), resorcinol, hydroquinone, 4,4'-dihydroxybenzophenone, bis(4-hydroxyphenyl) ethane, 1,5-dihydroxynaphthalene, 4,4'dihydroxybiphenyl, novolak resins containing more than 2 phenol moieties linked through methylene bridges, and the like.

Other epoxide resins are those prepared by reacting 1.2 up to about 2 mols of epichlorohydrin with 1 mol of a dihydric phenol or by reacting diepoxides with added dihydric phenol.

The epoxide resins also include polyglycidyl ethers of polyhydric alcohols, made by reacting a polyhydric alcohol and an acidic catalyst such as boron trifluoride, and subsequently treating the resulting product with an alkaline material. Included among the polyhydric alcohols that can be used in the preparation of these epoxide resins are glycerine, ethylene glycol, propylene glycol, diethylene glycol, hexanetriol, pentaerythritol, trimethylol ethane, trimethylol propane, etc. In addition, polyhydric ether alcohols, for instance diglycerol, dipentaerythritol, polyalkylene glycols and hydroxyalkyl ethers of the aforementioned polyhydric phenols can be used.

Also included in the definition of epoxide resins are glycidyl esters of polycarboxylic acids, such acids being azelaic acid, terephthalic acid, dimerized and trimerized unsaturated fatty acids, etc.

Still other epoxide resins are epoxidized hydrocarbons, such as vinyl cyclohexene dioxide, butadiene dioxide, dicyclopentadiene dioxide, epoxidized polybutadiene and limonene dioxide. Other epoxide resins are epoxidized esters, for example epoxidized unsaturated vegetable oils, epoxidized soybean oil, epoxidized glycerol trilinoleate and 3,4-epoxy-6-methycyclohexylmethyl-3, 4 - epoxy - 6 - methylcyclohexanecarboxylate. Still other epoxide resins are polymers and copolymers of vinyl polymerizable monoepoxides, such monoepoxides being allyl glycidyl ether, glycidyl acrylate and glycidyl methacrylate.

Epoxide resins useful in this invention are described in "Epoxy Resins" by Lee and Neville, McGraw-Hill Book Company, 1957.

The amount of amido-amine that is used in combination with the polyepoxide resins to produce cured compositions will generally be based on the active amine hydrogen content of the amido-amine and the epoxide content of the epoxide resin. This ratio will be about 0.5 to about 1.5 amine hydrogens per each epoxide groups. The compositions can be cured at room temperature or can be cured by heating, generally at a temperature of about 100° F. to about 300° F.

The invention will now be further illustrated by reference to the following examples in which all proportions are given by weight unless otherwise specified.

Example 1

To a suitable reaction flask equipped with a mechanical stirrer, thermocouple and condenser were added 25.65 parts of N-oleyl-trimethylenediamine. 5.44 parts of methacrylic acid were added to the flask over a period of 20 minutes during which time the temperature of the reaction mixture rose to 135° F. The temperature of the reaction mixture was then raised to 150° F. and a blend of 6.9 parts of triethylene tetramine and 3.76 parts of water were added to the reaction mixture over a period of 55 minutes while maintaining the temperature in the range of 150° F. to 160° F. When addition of the triethylene tetramine and water had been completed, the temperature of the reaction mixture was raised to 350° F. and held in the range of 350° F. to 360° F. for 4½ hours. The reaction mixture was then held at 350° F. under an absolute pressure of mm. Hg for 20 minutes, while the water of reaction and the added water were removed by distillation. The reaction product had a viscosity of 145 cps. at 25° C., a density of 7.6 lbs. per gallon at 25° C., an acid value of 0.7, a Gardner color of 8 to 9 and a titratable nitrogen content of 9.75 percent.

60 parts of the reaction product were blended with 100 parts of the diglycidyl ether of p,p'-dihydroxydiphenyl propane (Bisphenol A) having an expoxide equivalent weight of 190 and a viscosity of 12,000 cps. at 25° C. A portion of the blend was drawn down on a glass panel as a 5 mil thickness film and was allowed to cure for 16 hours at room temperature. The cured film was clear and hard. Another sample of the blend was cast into a mold and allowed to cure at room temperature for 16 hours. The cured casting had a hardness of 61 on the Shore D scale, and after an additional 32 hours, had a hardness of 73 on the Shore D scale.

Example 2

Using the same procedure as was described in Example 1, 943 parts of N-oleyl-trimethylene diamine were reacted with 168 parts of acrylic acid followed by reaction with 254 parts of diethylene tetramine and 135 parts of water. The resulting product had a viscosity of 109 cps. at 25° C., a density of 7.89 lbs. per gallon at 25° C., an acid value of 0.89, a Gardner color of 9 to 10 and a percent titratable nitrogen of 10.4.

60 parts of this reaction product were blended with 100 parts of the diglycidyl ether of Bisphenol A having an epoxide equivalent weight of 190 and a viscosity at 25° C. of 12,000 cps. A 5 mil thick film prepared on glass from a portion of the blend was allowed to cure for 16 hours at room temperature. The cured film was clear and hard. Another portion of the blend was cast into a mold and allowed to cure for 16 hours at room temperature. The cured casting had a hardness of 62 on the Shore D scale.

Example 3

Using the same procedure as was described in Example 1, 1044 parts of N-oleyl-trimethylene diamine were reacted with 222 parts of crotonic acid followed by reaction with 281 parts of triethylene tetramine and 153 parts of water. The resulting product had a viscosity of 119 centipoises at 25° C., a density of 7.6 lbs. per gallon at 25° C., an acid value of 1.28, a Gardner color of 12 to 13 and a percent titratable nitrogen of 10.2.

60 parts of the reaction product were blended with 100 parts of the diglycidyl ether of Bisphenol A having an epoxide equivalent weight of 190, and a viscosity of 12,000 cps. at 25° C. A portion of the blend was drawn down on a glass panel forming a film having a thickness of 5 mils. After standing for 16 hours at room temperature, the film was well cured and was clear and hard. Another portion of the blend was cast into a mold and allowed to cure for 16 hours at room temperature. The cured casting had a hardness of 48 on the Shore D scale.

Example 4

To a suitable reaction flask equipped as described in Example 1, were added 1012 parts of N-oleyl-trimethylene diamine and 273 parts of triethylene tetramine. The temperature was raised to 200° F. in 15 minutes and 215 parts of methacrylic acid were added over a period of 25 minutes while holding the temperature between 200° F. and 204° F. After all the acid had been added, the temperature was raised to 350° F. in 30 minutes and was held at 350° F. for 5 hours and 35 minutes. The product, 1380 parts, had a viscosity of 171 cps. at 25° C., a density of 7.64 lbs. per gallon at 25° C., an acid value of 1.29, a Gardner color of 9 and a percent titratable nitrogen of 10.33.

Well cured castings and films were obtained when this reaction product was blended with a diglycidyl ether of Bisphenol A and allowed to cure at room temperature for 16 hours.

Example 5

To a suitable reaction flask equipped as described in Example 1, were added 2025 parts of N-oleyl-trimethylene diamine and 545 parts of triethylene tetramine. The temperature of the reactants was raised to 150° F. and 430 parts of methyl acrylate were added over a period of 1 hour. The temperature was raised to reflux (270° F.) and was held at reflux for 3 hours. During this heating period, the temperature dropped to 240° F. due to the formation of methanol in the reflux. The methanol by-product was distilled off by heating to 270° F. followed by heating at this temperature under vacuum (20 mm. Hg pressure). After filtering, 2837 parts of product were obtained having a viscosity of 392 cps. at 25° C., a density of 7.69 lbs. per gallon at 25° C., a Gardner color of 6 to 7 and a percent titratable nitrogen of 10.65.

A portion of the reaction product, 1278 parts, was heated for 1 hour at 400° F., 1 hour at 450° F., 1 hour at 500° F., and 2 hours at 570° F., while removing water formed from the cyclization reaction, i.e., imidazoline formation. The resulting product, 1278 parts, had a viscosity of 59.4 cps. at 25° C., a density of 7.6 lbs. per gallon and a percent titratable nitrogen of 9.49.

The reaction product before and after cyclization when blended with the diglycidyl ether of Bisphenol A produced well-cured films and castings after standing at room temperature for 16 hours.

Example 6

Using the same procedure as was described in Example 5, 955 parts of N-oleyl-trimethylene diamine and 257 parts of triethylene tetramine were reacted with 236 parts of methyl methacrylate. The resulting product, 1316 parts, had a viscosity of 68 cps. at 25° C., a density of 7.54 lbs per gallon at 25° C., a Gardner color of 8 to 9 and a percent titratable nitrogen of 11.34. Well cured films were obtained when this reaction product was blended with epoxide resins prepared from the reaction of epichlorohydrin and Bisphenol A.

Example 7

Using the same procedure as was described in Example 1, 873 parts of N-(3-aminopropyl)-2-aminoundecane were reacted with 217 parts of methacrylic acid followed by reaction with 276 parts of triethylene tetramine and 134 parts of water. The resulting product, 1173 parts, had a viscosity of 160 cps. at 25° C., a density of 7.68 lbs. per gallon at 25° C., an acid value of 1.32, a Gardner color of 9 to 10 and a percent titratable nitrogen of 11.32. Well cured, clear films were obtained from this reaction product when blended with epoxide resins prepared from dihydric phenols and epichlorohydrin.

It is to be understood that the foregoing detailed description is given merely by way of illustration and that many variations may be made therein without departing from the spirit of the invention.

The embodiments of the invention in which an exclusive property or privilege is claimed are defined as follows:

1. An amido-amine composition consisting essentially of the reaction product of (a) a polyalkylene polyamine, (b) a fatty amine and (c) an alpha-beta unsaturated carbonylic compound wherein:
 (a) the polyalkylene polyamine is represented by the formula

wherein R is a hydrocarbon radical containing 2 to 4 carbon atoms and $n$ has a value of 0 to 4,
 (b) the fatty amine is represented by the formula

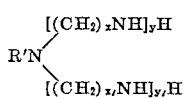

wherein R' is a hydrocarbon radical containing 8 to 24 carbon atoms, $x$ and $x'$ each have values of 2 to 4 and $y$ and $y'$ each have values of 0 to 2, and
 (c) the alpha-beta unsaturated carbonylic compound is represented by the formula

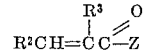

wherein $R^2$ is hydrogen or methyl, $R^3$ is hydrogen, methyl or ethyl, and Z is the radical $-NH_2$, $-OH$, $-OCH_3$ or $-OC_2H_5$,
and wherein the molar ratios of the reactants are: $a+b$ to $c$ being 4:3 to 2:1 and $a$ to $b$ being 20:1 to 1:3, said reaction product containing an average of more than two amino hydrogen atoms per molecule.

2. The composition of claim 1 wherein the polyalkylene polyamine is a polyethylene polyamine, the fatty amine is an N-alkyl trimethylene diamine, said alkyl group containing 10 to 20 carbon atoms, and the alpha-beta unsaturated carbonylic compound is an acrylic acid.

3. The composition of claim 1 wherein the polyalkylene polyamine is triethylene tetramine, the fatty amine is N-oleyl-trimethylene diamine and the alpha-beta unsaturated carbonylic compound is methacrylic acid.

4. The composition of claim 1 wherein the polyalkylene polyamine is tetraethylene pentamine, the fatty amine is N-(3-aminopropyl)-2-aminoundecane and the alpha-beta unsaturated carbonylic compound is methylacrylate.

5. The composition of claim 1 wherein the molar ratio of polyalkylene polyamine to fatty amine is about 5:1 to about 1:2.

References Cited

UNITED STATES PATENTS

| | | | |
|---|---|---|---|
| 3,337,609 | 8/1967 | Williamson et al. | 260—482 |
| 3,247,163 | 4/1966 | Reinking | 260—47 |
| 2,921,085 | 1/1960 | Schramm | 260—458 |

NICHOLAS S. RIZZO, *Primary Examiner.*

J. NARCAVAGE, *Assistant Examiner.*

U.S. Cl. X.R.

260—2, 47